(12) United States Patent  (10) Patent No.: US 7,568,066 B2
Yule  (45) Date of Patent: Jul. 28, 2009

(54) RESET SYSTEM FOR BUFFER AND METHOD THEREOF

(75) Inventor: David Caldecott Yule, Taipei (TW)

(73) Assignee: Arcadyan Technology Corporation, Hsinchu (TW)

( * ) Notice: Subject to any disclaimer, the term of this patent is extended or adjusted under 35 U.S.C. 154(b) by 293 days.

(21) Appl. No.: 11/526,657

(22) Filed: Sep. 26, 2006

(65) Prior Publication Data

US 2008/0077760 A1 Mar. 27, 2008

(51) Int. Cl.
*G06F 12/00* (2006.01)

(52) U.S. Cl. .................. 711/110; 711/109; 711/147; 711/154; 711/156

(58) Field of Classification Search .................. None
See application file for complete search history.

(56) References Cited

U.S. PATENT DOCUMENTS 7,028,149 B2 * 4/2006 Grawrock et al. ........... 711/156

* cited by examiner

*Primary Examiner*—Pierre-Michel Bataille
*Assistant Examiner*—Shawn X Gu
(74) *Attorney, Agent, or Firm*—Rosenberg, Klein & Lee

(57) ABSTRACT

A reset system for a buffer and a method thereof are disclosed. The reset system of the present invention includes a resettable flag in the buffer and a control unit. The reset method is to set the resettable flag and reset buffer so tat each exchanged processing unit can re-read data in the buffer for processing. Moreover, the buffer further includes an overwriteable flag so as to prevent the data in the buffer to be overwritten and get lost.

20 Claims, 7 Drawing Sheets

RESET SYSTEM FOR BUFFER AND METHOD THEREOF

BACKGROUND OF THE INVENTION

The present invention relates to a buffer, especially to a reset system for a buffer and a method thereof.

Streaming Systems are applied to network for listening to broadcast, playing music or watching movies. The streaming system basically includes a plurality of processing units and a plurality of buffers. A buffer used to store data temporarily is disposed between two contiguous processing units. Please refer to FIG. 1, a conventional streaming system applied to internet includes a first processing unit 20', a second processing unit 22', a third processing unit 24', a fourth processing unit 26', a first buffer 30' and a second buffer 32'. The first processing unit 20' is for downloading data and saving the data into the first buffer 30'. According to the data type inside the first buffer 30' such as MP3(Moving Picture Experts Group 1 Audio Layer 3), WMA(Windows Media audio), or WMV(Windows Media Video), the second processing unit 22' and the third processing unit 24' are respectively used to deal with data inside the first buffer 30'. The second processing unit 22' reads d at a inside the first buffer 30', processes the data, and then the processed data is saved into the second buffer 32'. If the second processing unit 22' is unable to process the data from the first buffer 30', then the system may be reset and the process restarted using the third processing unit 24' to read the data inside the first buffer 30', process the data, and then the processed data is saved into the second buffer 32'. Next, the fourth processing unit 26'reads the processed data from the second buffer 32' for display. The first buffer 30' and the second buffer 32 ' are ring buffers with character of FIFO (First In First Out).

Refer to FIG. 2A, the buffer 1' includes a start pointer 5' and an end pointer 7', respectively indicating starting positions and end position of the data 10' inside the buffer 1'. When data is read from the buffer, it is read from the start pointer 5', which then moves forward. When data is written to the buffer it is written after the end pointer 7', which then moves forward.

Moreover, refer to FIG. 2B, when the data 10' in the buffer 1' has been read, the start pointer 5' moves forwards to a last position that has been read. Once the data 10' has all been read, the start pointer 5' points to the same position as the end pointer 7' points. Then a data 12' is saved into the buffer 1', the data 12' is written in from the position that the end pointer 7' points and the end pointer 7' moves forwards until all the data 12' has been written into the buffer 1'. When the data 12' is written to the last position in the buffer while it's still not finished, the end pointer 7' moves back to the beginning of the buffer 1' for continuing writing rest of the data 12'. Thus the data 10' that has been read is overwritten now. Therefore, such kind of buffer 1' is called ring buffer.

Back to FIG. 1, if the second processing unit 22' can't process data of the first buffer 30', it would be desirable for the third processing unit 24' to try to read and process the data of the first buffer 30'. However the start address 5' has moved forward to the last position that has been read by the second processing unit 22', so the third processing unit 24' is unable to read original data in the first buffer 30'. Thus, we would need to reset the whole system and restart first processing unit 20' to allow the third processing unit 24' to process data.

SUMMARY OF THE INVENTION

Therefore it is a primary object of the present invention to provide a buffer disposed with a reset function and a resettable flag that allows for resetting the buffer while exchanging processing units so as to make the processing unit re-read original data in the buffer after exchanging.

It is another object of the present invention to provide a buffer disposed with an overwriteable flag. When it is uncertain whether the subsequent processing unit can process data in the buffer, the overwriteable flag is set so that subsequent data can't be written into the buffer. Therefore, original data in the buffer won't be overwritten and won't be lost.

In order to achieve above the objective, a buffer reset system according to the present invention includes a reset function, a resettable flag, an overwriteable flag and a control unit. The resettable flag as well as the overwriteable flag are disposed in the buffer while the control unit can use the reset function and can set the overwriteable flag. By the control unit using the reset function, the buffer is reset and a processing unit can re-read data in the buffer after being exchanged. The setting of the overwriteable flag keeps data in the buffer to avoid lost of the data.

A reset method according to the present invention is to call the reset function after checking the resettable flag according to status of the data in the buffer being processed by a processing unit. When a first processing unit reads the data in the buffer but can't process it, a control unit checks the resettable flag, and if it is set it calls the reset function and exchanges the first processing unit for a second processing unit so that the second processing unit replaces the first processing unit to re-read the data in the buffer for processing. The resettable flag will be set until some of the data in the buffer is overwritten, at which point the flag will be set to false. Moreover, when it is uncertain whether the data in the buffer is processable by the processing unit, the control unit may set the overwriteable flag to a non-overwriteable parameter so that subsequent data can't be written into the buffer if it would overwrite any old data. When it's sure that the data in the buffer is processable by the processing unit, the overwriteable flag is set to an overwriteable parameter. Thus the subsequent data is written into the buffer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
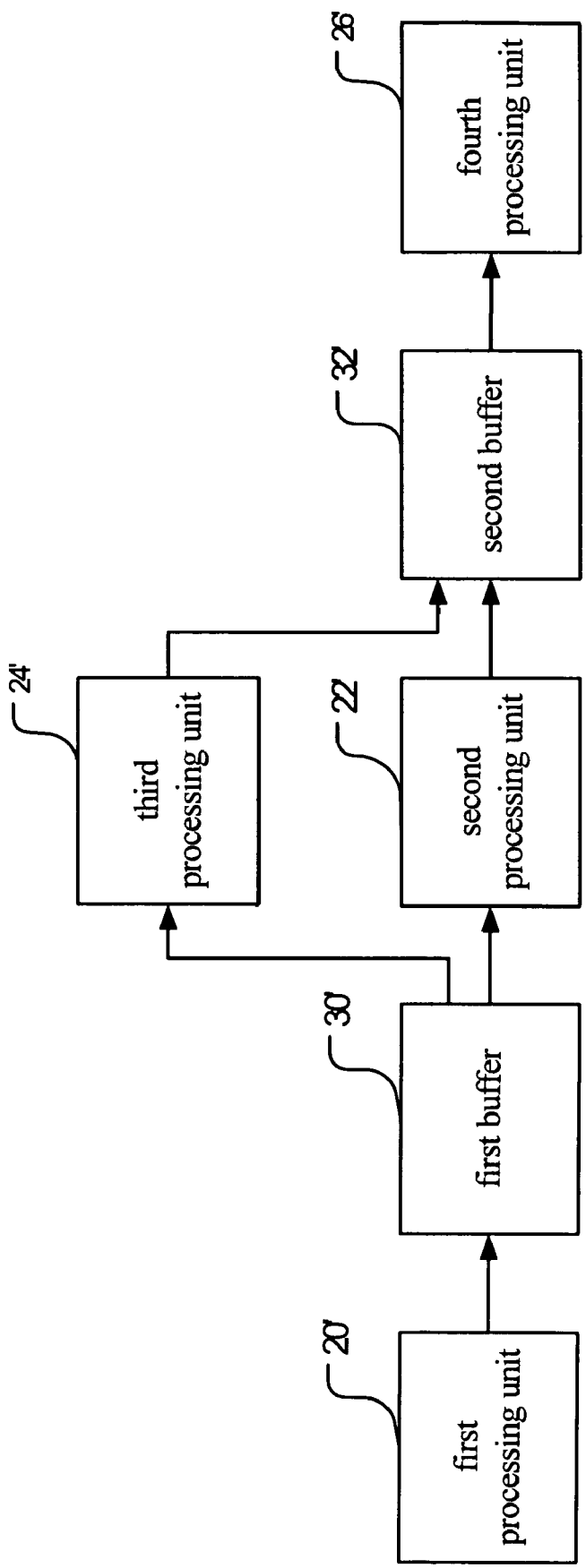
FIG. 1 is a block diagram of a conventional streaming system.
Figure 2A:
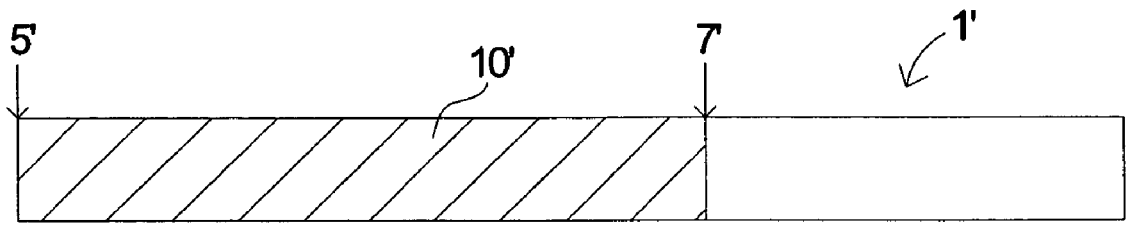
FIG. 2A is a schematic drawing showing how a conventional ring buffer saves data.
Figure 2B:
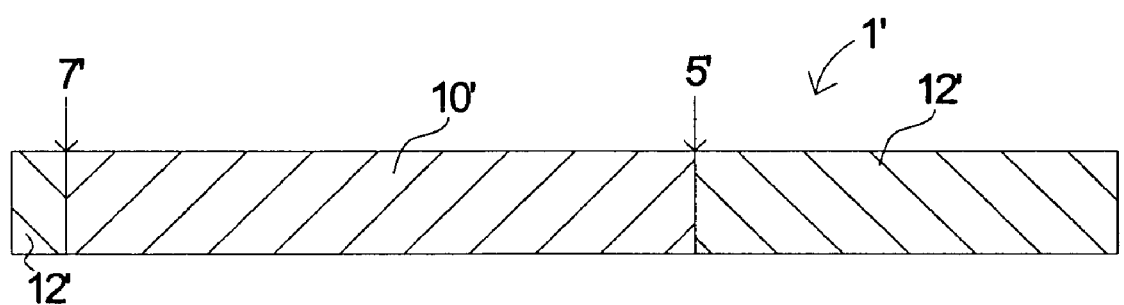
FIG. 2B is a schematic drawing showing how data is overwritten in a conventional ring buffer.
Figure 3:
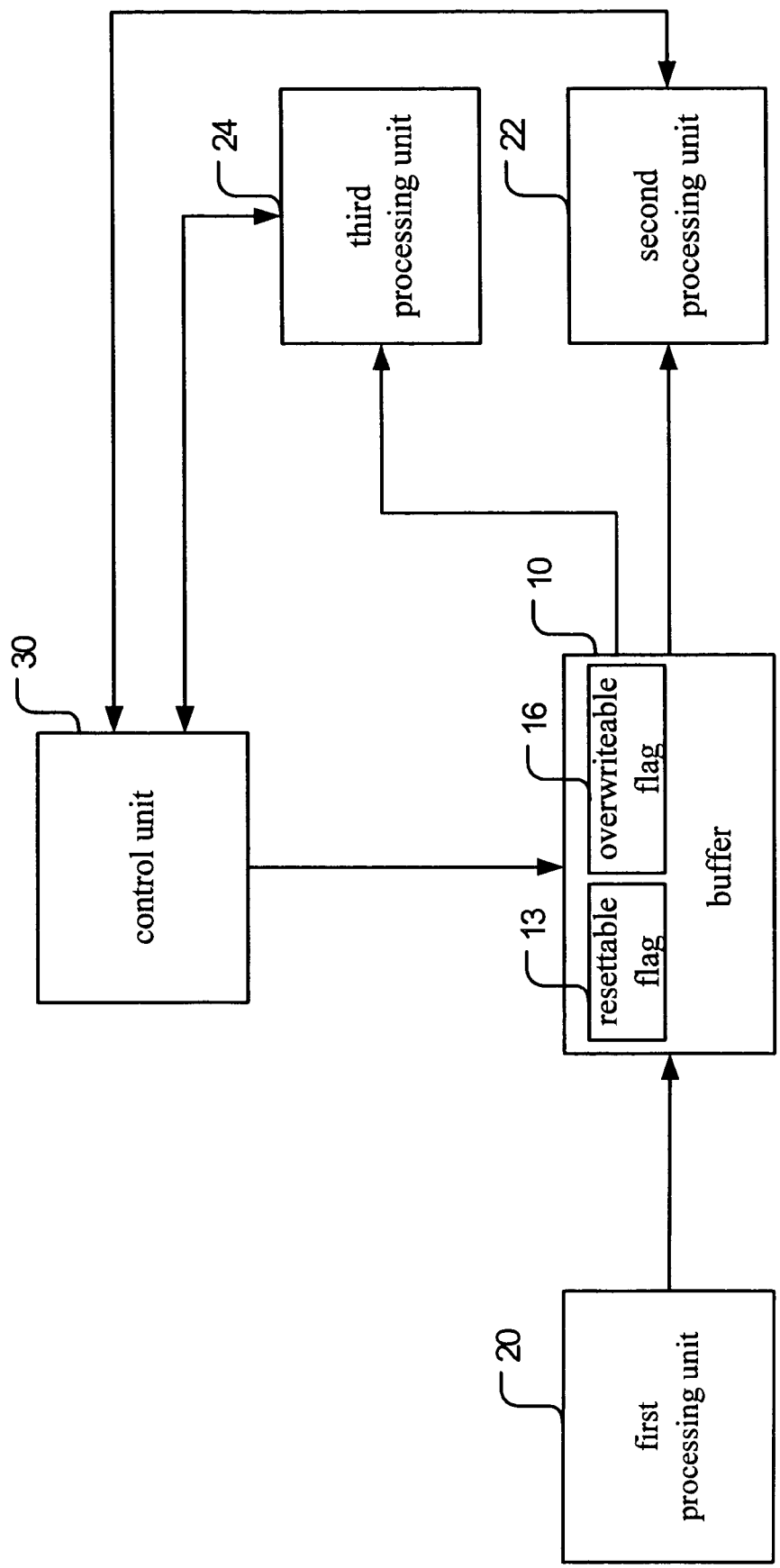
FIG. 3 is a block diagram of an embodiment according to the present invention.

Refer to FIG. 3, a reset system for a buffer in accordance with the present invention consists of a control unit 30, a resettable flag 13 and a overwriteable flag 16. Both the resettable flag 13 and the overwriteable flag 16 are disposed in a buffer 10. The control unit 30 may check the state of the resettable flag 13 and may also check and alter the overwriteable flag 16 for controlling reading and writing data into the buffer 10. When the control unit 30 sees that the resettable flag 13 is set, then the control unit 30 is allowed to call a reset function so that the buffer 10 is reset. That means the start pointer of the buffer 10 is reset and going back to a previous position so that the third processing unit 24 can re-read original data in the buffer 10 for processing when the second processing unit 22 has read data in the buffer 10 and unable to process the data. If the resettable flag 13 is set to a non-resettable parameter, then the control unit 30 will not be able to reset the buffer. Initially, the resettable flag 13 is set to a resettable parameter, and will be set to non-resettable automatically as soon as any data in the buffer is overwritten.

Figure 4:
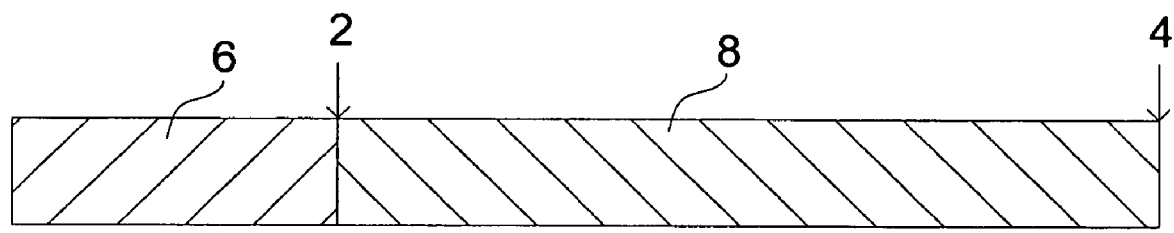
FIG. 4 is a schematic drawing showing how a ring buffer saves data at the overwriteable flag set to the non-overwriteable parameter.

When the control unit 30 sets the overwriteable flag 16 to a non-overwriteable parameter, it's false in logic and the first processing unit 20 can't write data into the 20 buffer 10 that would cause data to be overwritten,as shown FIG. 4. The buffer 10 is able to write data 8 until the data pointer reaches End Pointer 4. At this point, no more data can be written. Thus the original data inside the buffer 10 will not be overwritten and will not be lost. Therefore, the original data in the buffer 10 is kept when the second processing unit 22 or the third processing unit 24 read the data in the buffer 10. When the control unit 30 sets the overwriteable flag 16 to an overwriteable parameter, it's true in logic and the buffer 10 is able to be written with data.

After the first processing unit 20 saves a first data into the buffer 10, the second processing unit 22 may read the first data in the buffer 10 for processing. While processing the first data, the second processing unit 22 may send a responding signal to the control unit 30 to inform it that it can process the data. If the second processing unit 22 can process the first data, the control unit 30 sets the overwriteable flag 16 to a overwriteable parameter according to the responding signal showing the data is able to be processed so as to allow the first processing unit 20 overwrite data into the buffer 10. If the second processing unit 22 can't process the first data, the control unit 30 checks the resettable flag in buffer 10, and resets the buffer if it this flag is set to True. It then sends a switching signal to the third processing unit 24 according to the responding signal showing that the data in the first data in the buffer 10 is available to be. That means the control unit 30 exchanges the second processing unit 22 for the third processing unit 24.

Moreover, while sending the switching signal, the control unit 30 simultaneously resets the buffer 10, which also sets the resettable flag 13 to a reset parameter. Thus the start pointer moves back to the beginning position of the first data in the buffer 10 and the third processing unit 24 reads from the beginning of the first data in the buffer 10. Therefore, the problem that the third processing unit 24 can't read original data in the buffer 10 again which the second processing unit 22 has processed is solved and the efficiency of the buffer 10 is improved. When processing the first data, the third processing unit 24 may also send a signal to the control unit 30 so as to make the control unit 30 set the overwriteable flag 16 to an overwritable parameter. Thus the first processing unit 20 keeps writing data into the buffer 10. If the overwriteable flag 16 is set and the first processing unit 20 writes enough data into buffer 10 to overwrite some data, then the resettable flag 13 will be set to the non-resettable parameter.

Furthermore, later if the data being saved into the buffer 10 by the first processing unit 20 can't be processed by the third processing unit 24, then the third processing unit 24 sends a responding signal showing that the data is unprocessable to the control unit 30. Then, if there are any other processing units, the control unit 30 will send a switching signal to the following processing unit for exchanging the third processing unit 24. Thus the third processing unit 24 is replaced by the following processing unit. At the same time, the control unit 30 resets the buffer 10 and sets the resettable flag 13 to the resettable parameter.

Figure 5:
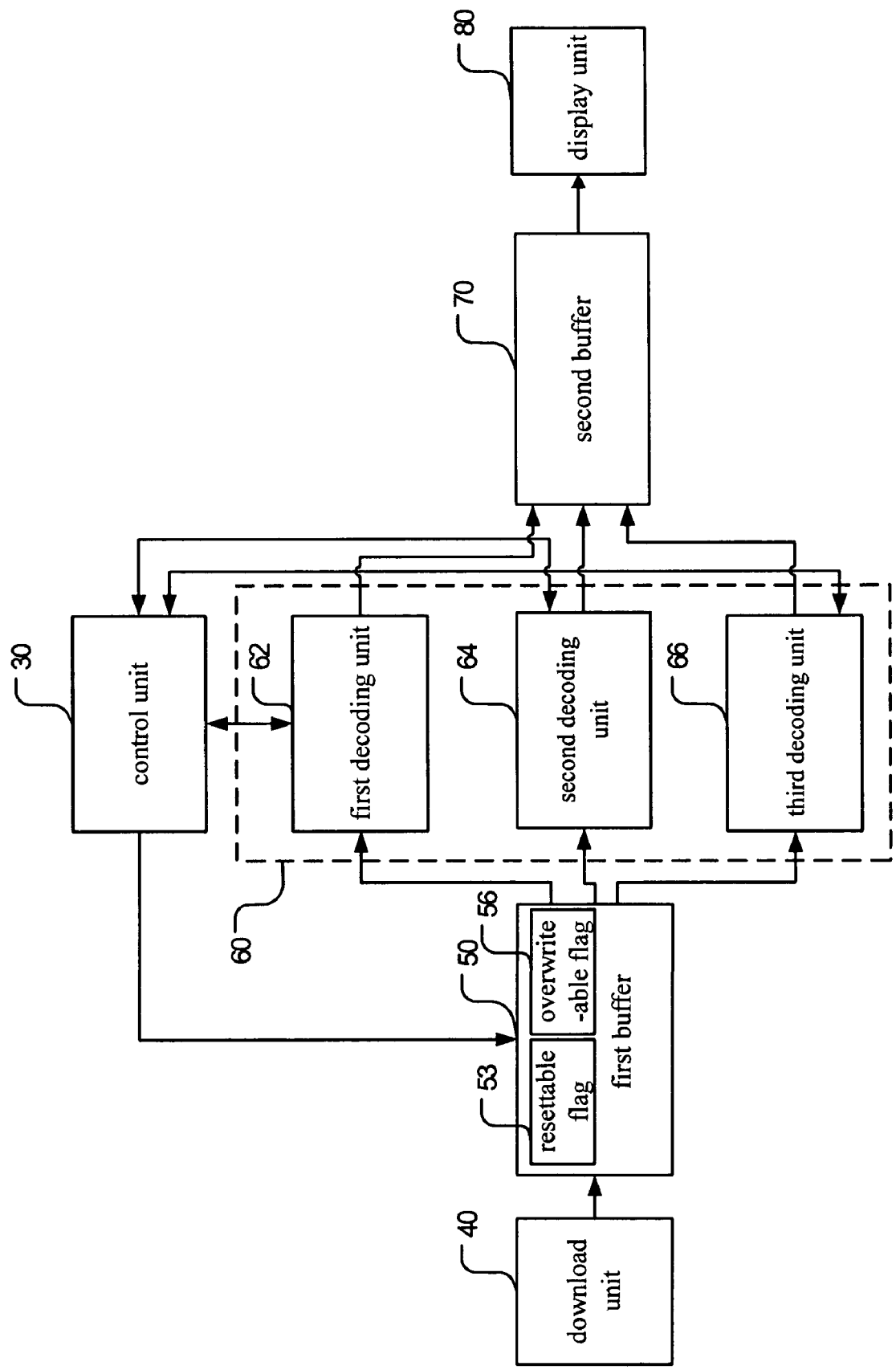
FIG. 5 is a block diagram of another embodiment according to the present invention.

Refer to FIG. 5, a buffer set system according to the present invention is applied to internet streaming systems. The streaming system includes a download unit 40, a first buffer 50, a decoding module 60, a second buffer 70 and a display unit 80. The download unit 40 downloads a network data and writes it into the first buffer 50. The network data format can be WMA(Windows Media audio), WMV(Windows Media Video), MP3(Moving Picture Experts Group 1 Audio Layer 3), or any other format. In some cases, we will not know which format the data will be before we start streaming, so in the beginning, it is not sure whether a first decoding unit 62, a second decoding unit 64 and a third decoding unit 66 of the decoding module 60 can decode the network data in the first buffer 50 or not. Initially, the overwriteable flag 56 of the first buffer 50 will be set to a non-overwriteable parameter, so as to ensure that the system can switch between decoding units.

The decoding module 60 is used to decode the network data in the first buffer 50 while the first decoding unit 62, the second decoding unit 64, and the third decoding unit 66 are respectively for decoding the WMA format, WMV format, and MP3 format. When network data is saved in the first buffer 50, firstly the first decoding unit 62 reads the network data in the first buffer 50. Once the network data format in the first buffer 50 is WMA, the first decoding unit 62 decodes the data and sends a responding signal showing the data is able to be processed to the control unit 30 so as to make the control unit 30 get the fact that the first decoding unit 62 has decoded the data. Then the control unit 30 sets the overwriteable flag 56 of the first buffer 50 to a overwriteable parameter so that the download unit 40 continuingly saves more network data into the first buffer 50.

If format of the network data downloaded by the download unit 40 is MP3, the first decoding unit 62 is unable to decode the data and is sending a responding signal showing that it's unable to process the data simultaneously to the control unit 30 so as to make the control unit 30 get the fact that the first decoding unit 62 is unable to decode the network data in the first buffer 50. Then the control unit 30 sends a switching signal to the second decoding unit 64 for replacing the first decoding unit 62. At the same time, the control unit 30 also resets the first buffer. Thus the second decoding unit 64 can re-read original network data in the first buffer 50 the network data which the first decoding unit 62 has read but can't process.

Because the second decoding unit 64 decodes only network data in WMV format, it can't decode network data in MP3 format. At this time, the second decoding unit 64 also sends a responding signal showing that the second decoding unit 64 can't process the data to the control unit 30 to make the control unit 30 send a switching signal to the third decoding unit 66 to exchange the second decoding unit 64 for the third decoding unit 66. The control unit 30 again resets the first buffer 50 and allows the third decoding unit 66 to re-read network data in the first buffer 50.

The third decoding unit 66 sends a responding signal showing processable data to the control signal because the network data saved in the first buffers complies with data format that the third decoding unit 66 can decode. According to this signal, the control unit 30 sets the overwriteable flag 56 to a overwriteable parameter so as to allow the download unit 40 continuingly save network data into the first buffer 50 to overwrite original network data. Thus the third decoding unit 66 keeps reading network data in the first buffer 50 for decoding.

When the format of network data downloaded by the download unit 40 is not WMA, WMV or MP3, the decoding units 62, 64, 66 of the decoding module 60 can't decode the data in the first buffer 50 and the control unit 30 of this network streaming system can't detect existence of any other decoding unit, there is an error happened in this network streaming system and the network data in the first buffer 50 can't be decoded.

After the first decoding unit 62, the second decoding unit 64, or the third decoding unit 66 decoding network data, the data being decoded is saved into the second buffer 70. Next, the display unit 80 reads the decoded data in the second buffer 70 for displaying. In this example, because the format of the decoded data generated by the decoding module 60 matches data format that can be displayed by the display unit 80, there is no need to dispose a resettable flag and an overwriteable flag in the second buffer 70. In this case, the overwriteable flag can initially be set to True, and the second buffer 70 will behave as a traditional ring buffer. However, the same principal could be applied to the second buffer 70 if there were multiple different formats.

Figure 6:
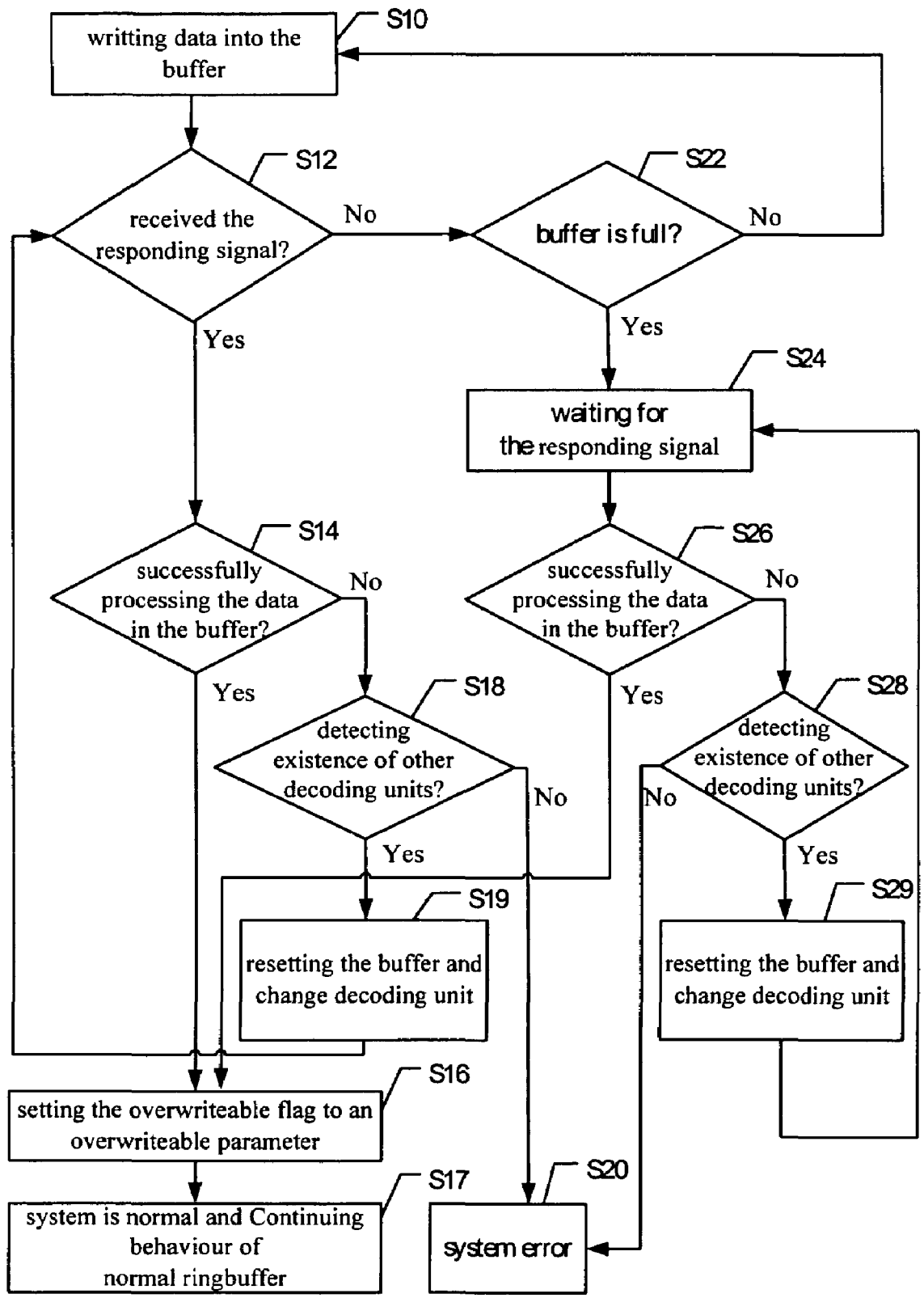
FIG. 6 is a flow chart of an embodiment according to the present invention.

Refer to FIG. 6 & FIG. 3, a flow chart of an embodiment according to the present invention is disclosed. When it is uncertain whether the processing units 22, 24 can process the data in the buffer 10, the overwriteable flag 16 in the buffer 10 is set to a non-overwriteable parameter so as to make the first processing unit 20 unable to save data into the buffer 10 beyond its basic size. Thus original data in the buffer 10 will not be overwritten and lost when the processing units 22, 24 can't process the data in the buffer 10 and the first processing unit 20 keeps saving data into the buffer 10. As shown in step S10, before the first processing unit 20 writes data into the buffer 10, the control unit 30 sets the overwriteable flag 16 in the buffer 10 to a non-overwriteable parameter so that no data is overwritten in the buffer 10.

Meanwhile the second processing unit 22 reads and processes data in the buffer 10. According to the status of the processed data, a responding signal is sent to the control unit 30 correspondingly. Refer to step S12, after receiving the responding signal, the control unit 30 further in step S14, checks whether the second processing unit 22 could process the data in the buffer 10. If the second processing unit 22 could process the data in the buffer 10, the control unit 30 takes the step S16, set the overwriteable flag 16 to an overwriteable parameter so that the buffer 10 can be written with data and the second processing unit 22 keeps reading and processing the data in the buffer 10.

If the responding signal sent by the second processing unit 22 shows that the data can't be processed, the control unit 30 receives such fact while executing the step S14 and then run step S18, detect existence of other decoding units. Take the embodiment in FIG. 3 as an example, the control unit 30 detects the third processing unit 24 and take step S19, resets the buffer 10 and send a switching signal to the third processing unit 24 for replacing the second processing unit 22 with the third processing unit 24 so that the third processing unit 24 reads original data in the buffer 10 for processing. Then repeat step S12 and step S14. If the third processing unit 24 can process the data in the buffer 10, run the step S16 and run the step S17. It means the system is normal and continuing behaviour of normal ring buffer. Once the third processing unit 24 can't process the data in the buffer 10, take the step S18. Because the control unit 30 detects that there is no other processing unit, as shown in step S20, there is a system error and the data in the buffer 10 can't be processed.

In the step S12, if the control unit 30 has not yet received a responding signal, it takes the step S22-detect whether the buffer 10 is full. Because the overwriteable flag is set to False, the buffer will be full when the first buffer has received as much data as it can store—irrespective of how much data has been read by the processing unit. If the buffer 10 is not filled with data, it waits for more data in step S10 and again checks for a signal in step S12. If the buffer 10 is filled with 20 data, the control unit 30 runs the step S24-keep waiting for the responding signal. Later, after receiving the responding signal, the control unit runs step S26 that is the same step with the step S14. If the responding signal shows that the data in the buffer 10 can be processed, take the step S16 and take the step S17. If the responding signal shows that the data in the buffer 10 can't be processed, take the step S28 that is the equivalent to the step S18. Once the control unit 30 detects no other processing unit, as shown in the step S20, there is a system error. If there is other processing unit, take step S29 that is equivalent to step S19. Then repeatedly run the step S24.

Figure 7:
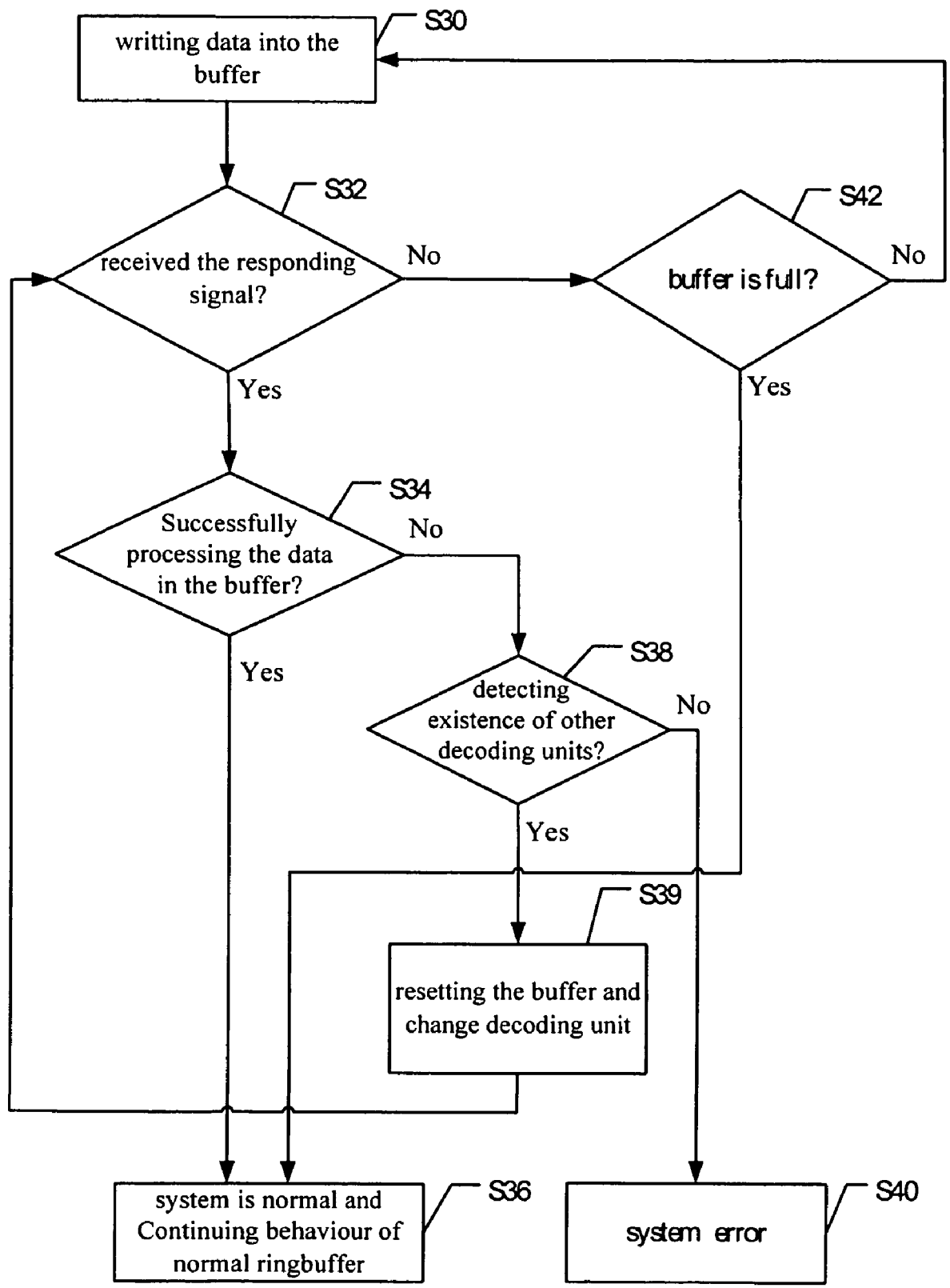
FIG. 7 is a flow chart of another embodiment according to the present invention.

Refer to FIG. 7 & FIG. 3, a flow chart showing the process where the overwriteable flag in the buffer is set to an overwriteable parameter by the control unit. Because the overwriteable flag 16 in the buffer 10 is set to an overwriteable parameter, as shown in step S30, the first processing unit 20 can write data into the buffer 10. Then the second processing unit 22 firstly reads and processes data in the buffer 10, and then may send a responding signal according to status of the data being processed. Refer to step S32, after receiving the responding signal, the control unit 30 executes step S34. If the responding signal shows that the second processing unit 22 could process the data in the buffer 10, it means the system is normal and continuing behaviour of normal ringbuffer, as shown in step S36, the second processing unit 22 continuingly reads and processes the data in the buffer 10.

If the responding signal shows that the second processing unit 22 can't process the data in the buffer 10, the control unit 30 takes the step S38-detect existence of another processing unit. In this embodiment, it's the third processing unit 24. Then run step S39, reset the buffer 10 and exchange the second processing unit 22 for the third processing unit 24. After finishing the replacement repeatedly run the step S32. Next, if the third processing unit 24 also can't process the data in the buffer 10, as shown in step S40, it is a system error because there is no other processing unit in the system for replacement.

In the step S32, if the control unit 30 has not yet received a responding signal, as shown in step S42, the control unit 30 detects whether the buffer 10 is full. When the buffer 10 is not yet full with data, the control unit 30 waits for more data in step S10 and again checks for a signal in step S12. If the buffer 10 is full, the control unit 30 gets the fact that the system is normal. Since the overwriteable flag 16 is set to an overwriteable parameter, it assumes that the active processing unit in the system can process data in the buffer 10. Thus the system is normal. When the overwriteable flag is set to an overwriteable parameter, it is not necessary to follow the flow chart in FIG. 5. If it is sure processing units of the system can process data in the buffer, the overwriteable flag can be directly set to an overwriteable parameter.

In summary, a buffer reset system and a method thereof according to the present invention disposes a method for resetting the buffer while exchanging two processing units. Thus after exchange, the new processing unit can re-read data that has been read by the previous processing unit yet has not been processed. Moreover, the present invention includes a resettable flag in the buffer, which will be automatically set by the buffer to allow any controlling unit to know whether the system can be reset. Furthermore, the present invention includes a overwriteable flag in the buffer. When it is uncertain whether the processing units of the system can process data in the buffer, the overwrite able flag is set to a non-overwriteable parameter so that the data can't be written to the buffer if it would overwrite previously read data. When it is sure that a processing unit can process data in the buffer this flag can be set to overwriteable, so allowing normal ringbuffer behaviour. Therefore, the data in the buffer will not be lost until it is sure it is not needed and the efficiency of the buffer is increased. If the overwriteable flag is initially set to an overwriteable parameter, then the system will behave as a normal ring buffer, while also allowing a reset and switch of processing units before too much data is read in.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A reset system for a buffer comprising:
a resettable flag and an overwriteable flag disposed in a the buffer wherein the buffer start pointer is reset to a previous position when the resettable flag is set to a resettable parameter and the said buffer is overwriteable when the said overwriteable flag is set to an overwriteable parameter; and
a control unit coupled to said buffer and a plurality of processing units, said control unit for calling a reset function when a first one of said processing units reads data in the buffer which is format incompatible to process the data, said overwriteable flag being set to a non-overwriteable parameter by the said control unit when incompatible data is sent to one of said processing units, said overwriteable flag is set to art overwriteable parameter when compatible data is sent to one of the said processing units, whereby said control unit calls the reset function for resetting the buffer and passing the data to a second one of said processing units so that the second processing unit replaces the first processing unit to reads and processes data in the buffer whereby when said data is incompatible with a last one of said processing units an error signal is generated to said control unit.

2. The system as claimed in claim 1, wherein after the second processing unit replaces the first processing unit to read and process data in the buffer, the resettable flag is automatically set to a non-resettable parameter and the buffer is not reset.

3. The system as claimed in claim 1, wherein the control unit detects whether another processing unit exists before passing the data to the said other processing unit.

4. The system as claimed in claim 1, wherein the buffer further comprising the overwriteable flag; when the overwriteable flag is set to the non-overwriteable parameter by the control unit, the buffer is unable to be overwritten with data by the plurality of processing units while when the overwriteable flag is set to an overwriteable parameter by the control unit, buffer is able to be overwritten with data.

5. The system as claimed in claim 4, wherein after the overwriteable flag being set to the non-overwriteable parameter by the control unit, the control unit sets the overwriteable flag to the overwriteable parameter for allowing subsequent data being written into the buffer when the first processing unit or the second processing unit is able to process the data in the buffer.

6. The system as claimed in claim 5, wherein the first processing unit and the second processing unit send a responding signal to the control unit according to whether data is processable after reading and processing the data in the buffer while the control unit sets the overwriteable flag according to the responding signal.

7. The system as claimed in claim 6, wherein the overwriteable flag is set to the non-overwriteable parameter while the control unit keeps waiting the responding signal for setting the overwriteable flag when the first processing unit or the second processing unit hasn't sent the responding signal to the control unit.

8. The system as claimed in claim 1, wherein the buffer is a ring buffer.

9. The system as claimed in claim 1, wherein the buffer is a FIFO (First In First Out) buffer.

10. The system as claimed in claim 1, wherein the resetting of the buffet is that a start pointer of the buffer moves forward, going back to a beginning position of the buffer.

11. The system as claimed in claim 1, wherein the buffer is applied to a streaming system.

12. A reset method for a buffer, which includes a resettable flag and a buffer start pointer is reset to a previous position when the resettable flag is set to a resettable parameter, comprising the steps of:
setting the resettable flag within the buffer according to status of data in the buffer being read and processed by a first processing unit of a plurality of processing units;
further setting the resettable flag to the resettable parameter for resetting the buffer and passing the data to a second processing unit when said first processing unit reads the data in the buffer which is incompatible with said first processing unit; replacing the second processing unit for the first processing unit to read and process the data in the buffer; and, generating an error signal to a control unit when said data is incompatible with a last of said plurality of processing units.

13. The method as claimed in claim 12, wherein after replacing the second processing unit for the first processing unit to read and process the data in the buffer, the resettable flag is automatically set to a non-resettable parameter and the buffer is not reset.

14. The method as claimed in claim 12, wherein before passing data to the second processing unit, the method further comprising a step of:
detecting whether the second processing unit exists or not.

15. The method as claimed in claim 12, wherein the buffer having an overwriteable flag; when the overwriteable flag is set to a non-overwriteable parameter, the buffer is unable to be overwritten with data by the plurality of processing units while when the overwriteable flag is set to an overwriteable parameter, the buffer is able to be overwritten with data.

16. The method as claimed in claim 15, wherein after the overwriteable flag being set to the non-overwriteable parameter, the overwriteable flag is set to the overwriteable parameter so as to make subsequent data to be overwritten into the buffer when the first processing unit or the second processing unit is able to process the data in the buffer.

17. The method as claimed in claim 16, wherein the first processing unit and the second processing unit send a responding signal to the control unit according to whether data is processable after reading and processing the data in the buffer and the overwriteable flag is set according to the responding signal.

18. The method as claimed in claim 17, wherein the overwriteable flag is set to the non-overwriteable parameter and then keep waiting the responding signal for setting the overwriteable flag when the first processing unit or the second processing unit hasn't sent the responding signal.

19. The method as claimed in claim 12, wherein the resetting of the buffer is that a start pointer of the buffer moves forward, going back to a beginning position of the buffer.

20. The method as claimed in claim 12, wherein the method is applied to the buffer of a streaming system.

* * * * *